(12) United States Patent
Kilts

(10) Patent No.: US 8,581,148 B2
(45) Date of Patent: Nov. 12, 2013

(54) METHODS AND APPARATUS PROVIDING FLAME-LESS HEAT

(75) Inventor: Harold James Kilts, Andover, MN (US)

(73) Assignee: Thawzall, LLC., Alexandria, MN (US)

( * ) Notice: Subject to any disclaimer, the term of this patent is extended or adjusted under 35 U.S.C. 154(b) by 425 days.

(21) Appl. No.: 13/040,903

(22) Filed: Mar. 4, 2011

(65) Prior Publication Data
US 2011/0215079 A1 Sep. 8, 2011

Related U.S. Application Data

(60) Provisional application No. 61/339,403, filed on Mar. 4, 2010, provisional application No. 61/339,411, filed on Mar. 4, 2010.

(51) Int. Cl.
*B60L 1/02* (2006.01)
*B60H 1/02* (2006.01)
*F01N 1/00* (2006.01)

(52) U.S. Cl.
USPC .............................. 219/208; 237/12.1; 60/272

(58) Field of Classification Search
USPC ................. 219/202, 205, 206, 208; 237/12.1, 237/12.3 R, 12.3 A, 12.3 C; 60/272, 273, 60/278, 324
See application file for complete search history.

(56) References Cited

U.S. PATENT DOCUMENTS

| | | | |
|---|---|---|---|
| 1,828,989 A | | 10/1931 | Wade |
| 2,452,170 A | * | 10/1948 | Wenger ..................... 237/12.3 A |
| 3,327,773 A | * | 6/1967 | Korschner ..................... 165/299 |
| 3,976,125 A | | 8/1976 | Best |
| 4,065,055 A | * | 12/1977 | De Cosimo .................. 237/12.1 |
| 4,120,157 A | | 10/1978 | Tang |
| 4,593,753 A | | 6/1986 | McConnell |
| 4,986,311 A | | 1/1991 | Mikkelson |
| 5,181,655 A | | 1/1993 | Bruckelmyer |
| 5,181,796 A | | 1/1993 | DeYoung |
| 5,244,310 A | | 9/1993 | Johnson |
| 5,366,308 A | | 11/1994 | Crispino |
| 5,535,944 A | * | 7/1996 | Knowles ......................... 237/13 |
| 5,567,085 A | | 10/1996 | Bruckelmyer |
| 5,707,179 A | | 1/1998 | Bruckelmyer |
| 5,820,301 A | | 10/1998 | Bruckelmyer |
| 5,838,880 A | | 11/1998 | Brooks, Jr. et al. |
| 5,964,402 A | | 10/1999 | Jakobson |
| 6,663,011 B1 | * | 12/2003 | Entleutner ................... 237/12.1 |

* cited by examiner

*Primary Examiner* — Sang Paik
(74) *Attorney, Agent, or Firm* — Alan Kamrath; Kamrath IP Lawfirm, P.A.

(57) ABSTRACT

An apparatus (10) provides flame-less heat utilizing electric heaters (90) receiving electricity from a generator (22) powered by an engine (20) of a self-contained trailer including a base (12) in the form of a fuel tank. An exhaust heat reclaimer (56) is located in an elevated portion (32) of a manifold (30) further including a vertical portion (42) in front of the engine (20). A centrifugal impeller (80) in a T interconnection draws air from the vertical portion (42) through a radiator (50) of the engine (20) and into first and second pressure blowers (76) which force air through the heaters (90) and transitions (92, 94) to exit ducts (96).

20 Claims, 2 Drawing Sheets

METHODS AND APPARATUS PROVIDING FLAME-LESS HEAT

CROSS REFERENCE

The present application claims benefit of U.S. Provisional Application Nos. 61/339,403 and 61/339,411 filed Mar. 4, 2010.

BACKGROUND

Apparatus is shown providing flame-less heat, particularly converting mechanical shaft power to flame-less heat, and specifically converting mechanized shaft power into electrical heat.

There are situations, such as on oil fields, where traditional methods of generating heat are not accepted. Unacceptable forms of heat generation include "flame-type" devices that burn a variety of fuels such as natural gas, fuel oil, propane, diesel fuel, etc. Use of diesel engines is commonly accepted for use in these "no flame" zones. It is common for heat to be generated using diesel engines in a portable system to provide either hot air or hot water in these special zones. Naturally, a system of this type would scavenge heat from the engine coolant and perhaps the exhaust stream and/or the turbocharger. To make a system like this work, there must be some manner of applying load to the engine shaft to create the waste heat that may be reclaimed. Various ways have been devised to convert the mechanical shaft power to heat so that the air or water is heated by the sum of the scavenged heat and the conversion of mechanical power to heat. Specifically, conventional devices utilize various forms of fluid shear or magnetic fields to create heat in metals or directly in fluid.

Such devices are typically run by taking in 100% outside air, which is quite often in sub-zero temperatures. Diesel engines typically have about 35% of the energy of the fuel discharged through the exhaust stack. Given that these systems can consume large quantities of fuel per day, thermal efficiency is important. Common practice for engine heat reclaim in these portable systems is to have the coldest outside air pass through the cooling radiator first before reclaiming heat from the exhaust. The radiator is typically in front of the engine, which is near the front of the trailer where intakes are located. Sometimes, different heat exchangers are employed to reclaim some energy from the exhaust, but in one way or the other, they all reclaim heat using air that has been already heated by engine coolant reclaim. Some route hot fluid from the mechanical heat conversion process through a liquid-to-air exhaust heat exchanger, and others simply route extra lengths of exhaust piping in the air plenum where this pre-heated air passes.

Fluid devices have a number of serious limitations. The fluids are prone to leak, because there are rotating mechanical elements with seals, pumps with seals, and control valves that can also leak. The durability of the seals is weakened by the fact that the fluid temperature is high. Since discharge temperatures of the air are desired to be above 200° F., the fluids will operate above 250° F. and, under some process interruptions, can rise much higher. Another limitation is foaming and breakdown of the fluid. Foaming causes sensors to be misread and interrupts the steady flow to transport heat away from the converting device. Yet another limitation is cavitation that erodes the shear device surfaces resulting in lack of reliability and the cause of much maintenance expense. The limited operating life typically requires that complete overhauls be performed after a few months of use.

The methods used to control the amount of engine load are themselves a maintenance issue and result in reduced reliability. Conventional systems also require that the engine be run at full speed regardless of load, thus adding more wear to the engine.

Thus, a need exists in the field of providing flame-less heat for methods and apparatus which are efficient, reliable and requiring less maintenance.

SUMMARY

This need and other problems in the field of providing flame-less heat is solved by providing, in a form shown, electric heaters receiving electricity from a generator powered by an engine mounted upon a base. Air flow occurs through the radiator of the engine before passing through the electric heaters, and in the form shown through an exhaust heat reclaimer located in the manifold before the radiator. Further, in the form shown, air enters from behind the apparatus through an elevated portion of the manifold above the engine and the generator. Air flows from the elevated portion to in front of the engine and the generator, through the radiator, and to a T interconnection. Air flows from first and second openings in the T interconnection through first and second transitions including first and second electric heaters out of first and second exit ducts behind the apparatus. Air is forced through the first and second openings by a centrifugal impeller and from the first and second openings into the first and second transitions by first and second pressure blowers.

The illustrative embodiments will become clearer in light of the following detailed description in connection with the drawings.

DESCRIPTION OF THE DRAWINGS

The illustrative embodiments may best be described by reference to the accompanying drawings where.

Figure 1:
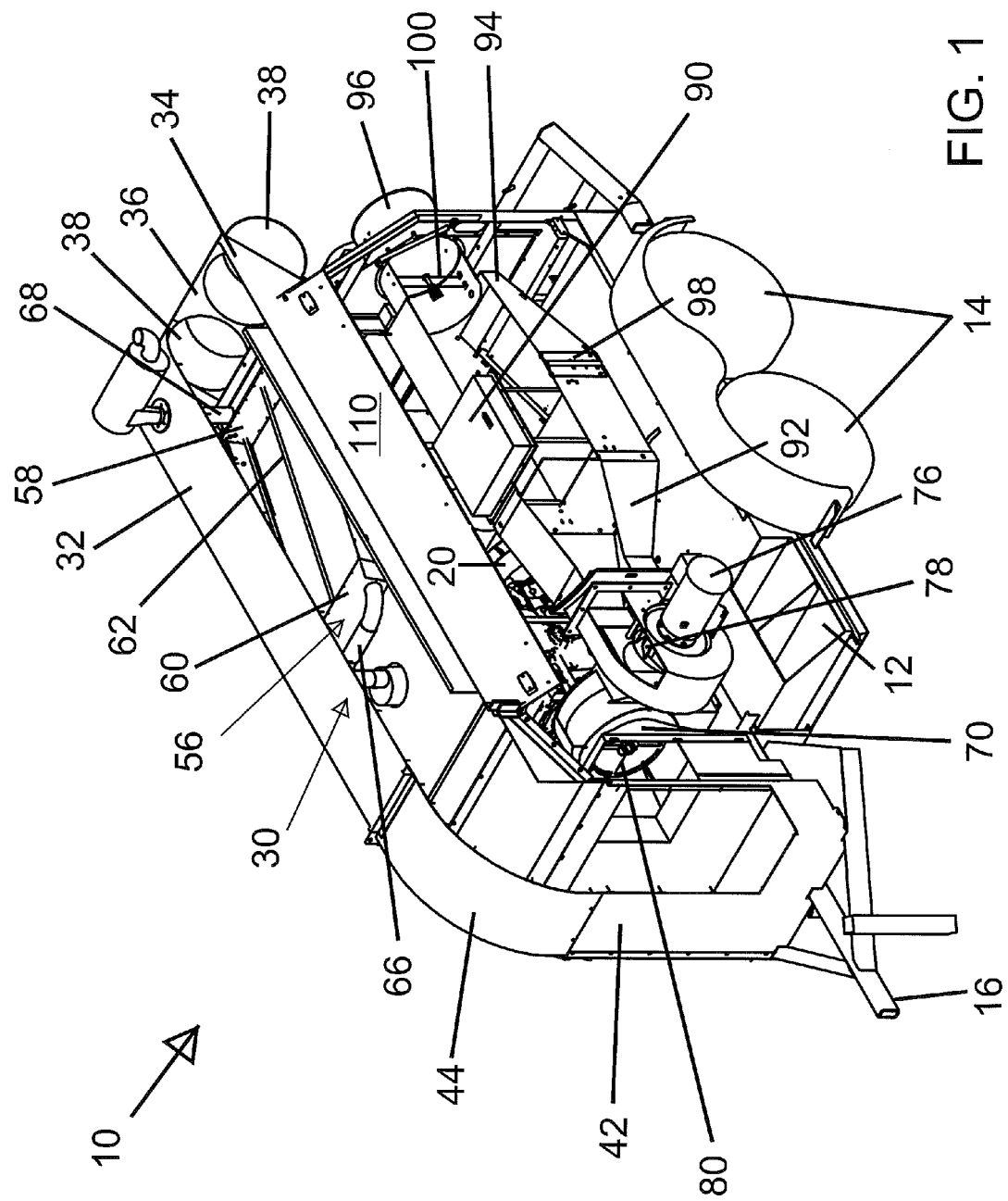
FIG. 1 shows a perspective view of an apparatus providing flame-less heat, with portions broken away for ease of illustration and to show internal components.
Figure 2:
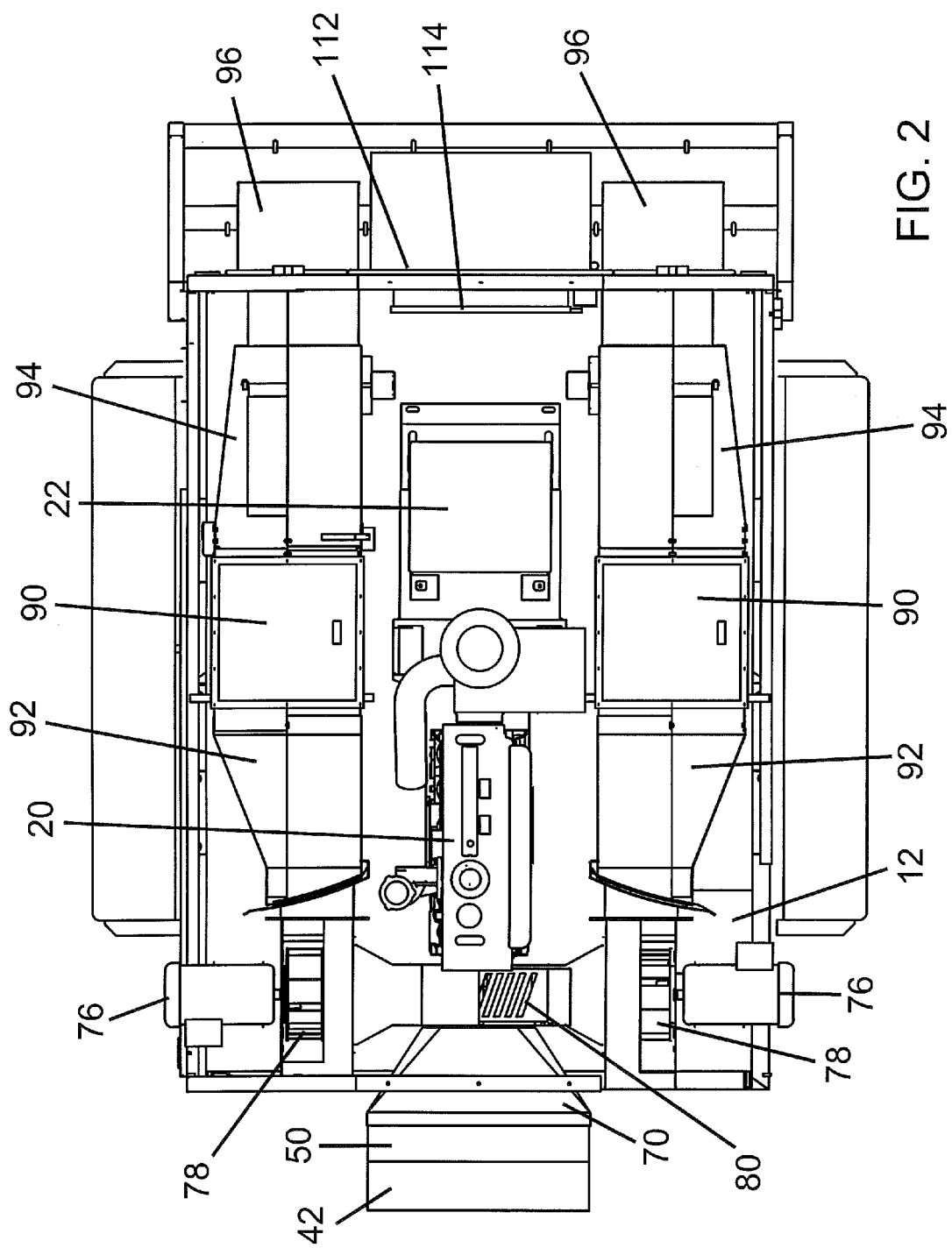
FIG. 2 shows a top, sectional view of the apparatus of FIG. 1, with portions broken away for ease of illustration and to show internal components.

All figures are drawn for ease of explanation of the basic teachings only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

Apparatus providing flame-less heat by converting mechanical shaft power is shown in the drawings and generally designated 10. In the form shown, apparatus 10 generally includes a base 12 to which wheels 14 providing mobility and a hitch 16 allowing transport are mounted. In the form shown, base 12 is hollow to form a tank for holding operating fuel for apparatus 10.

Apparatus 10 further includes an engine 20 or the like which provides rotation to a power shaft. In the form shown, engine 20 is a diesel engine, and base 12 holds diesel fuel for engine 20. Further, apparatus 10 includes a generator 22 which is connected to and powered by engine 20. Engine 20 and generator 22 can be of any conventional form including, but not limited to, the types available in the marketplace. Engine 20 and generator 22 are located generally in line and centrally spaced between the sides of base 12 and wheels 14.

Apparatus 10 further includes a heating air intake manifold 30 having an elevated portion 32 with generally rectangular cross sections of a width generally equal to the extent of engine 20 and generator 22 in a width direction between the sides of base 12 and wheels 14 and of a length greater than the extent of engine 20 and generator 22 in a length direction parallel to the sides of base 12 and wheels 14. Elevated portion 32 is elevated above and generally in line with engine 20 and generator 22. Manifold 30 includes an entrance portion 34 having generally rectangular cross sections of a size equal to elevated portion 32, with entrance portion 34 extending at an obtuse angle in the order of 140°. Entrance portion 34 terminates in an end plate 36 having first and second entrance ducts 38 shown as having circular cross sections extending therefrom. Thus, ducts 38 extend at an angle in the order of 60° to base 12 and are located on opposite sides of engine 20 and generator 22.

Manifold 30 further includes a generally vertical portion 42 of generally rectangular cross sections parallel to base 12 and having a generally arcuate transition 44 between portions 34 and 42. A radiator 50 through which engine coolant for engine 20 flows is located intermediate engine 20 and portion 42. Manifold 30 is generally closed aside from ducts 38 and radiator 50 for providing air flow from outside of apparatus 10 through ducts 38 and through manifold 30 and radiator 50. It should be appreciated that air can be drawn directly into ducts 38 and/or through tubing or the like connected to ducts 38 and with such tubing extending to a remote location including, but not limited to, an interior of a structure to which heat generated by apparatus 10 is to be provided. The angles of entrance 34 and ducts 38 provide synergistic air passage while reducing the possibility of other material carried by the air from entering manifold 30.

An exhaust heat reclaimer 56 is located in elevated portion 32 of manifold 30. In the form shown, reclaimer 56 includes upstream and downstream chambers 58 and 60 located in portion 32 extending between the sides thereof generally perpendicular to the air flow direction and located intermediate the top and bottom thereof and of a size which does not obstruct air passage in manifold 30 thereby. In the form shown, chambers 58 and 60 have a shape of a parallelepiped. Reclaimer 56 includes a plurality of spaced, parallel tubes 62 extending between and in fluid communication with chambers 58 and 60, with only some of the plurality of tubes 62 being shown for ease of illustration. Tubes 62 are at a non-parallel angle to the top and bottom of manifold 30 and in the form shown at a very small acute angle in the order of 12° relative thereto, with chamber 60 located adjacent to the top and spaced from the bottom of portion 32 and chamber 58 located adjacent to the bottom and spaced from the top of portion 32. The exhaust 66 through which exhaust fumes of engine 20 flow extends from engine 20 through the bottom of portion 32 and is in fluid communication with chamber 60. An outlet pipe 68 is in fluid communication with chamber 58 and extends through the top of portion 32 and communicates to the outside environment. Exhaust 66 and/or pipe 68 can include suitable mufflers if desired or necessary.

It should be appreciated that air passing from entrance ducts 38 and in a direction through manifold 30 must pass over chamber 58, around and through the plurality of tubes 62 and under chamber 60 before reaching transition 44 and portion 42. Thus, reclaimer 56 acts as a heat exchanger to reclaim heat in the exhaust fumes of engine 20 before the exhaust fumes are exhausted from apparatus 10 and into the environment. As the rate of heat exchange is directly related to the temperature of air passing through manifold 30 and as air will be at its lowest temperature when entering manifold 30, locating reclaimer 56 in manifold 30 upstream of radiator 50 produces synergistic heat reclamation from the exhaust fumes of engine 20.

A T interconnection 70 is in fluid communication with radiator 50 and includes first and second openings in fluid communication with first and second pressure blowers 76 having impellers 78 rotatable about axes which are parallel to the width direction. In the form shown, interconnection 70 further includes a centrifugal impeller 80 rotatable about an axis parallel to the length direction and perpendicular to the axes of impellers 78.

Apparatus 10 further includes first and second electric process air heaters 90 which receive electrical power from generator 22 and produce heat. Heaters 90 are only partially shown and can take a variety of forms including, but not limited to, those commercially available such as from Indeeco Manufacturing of St. Louis, Mo. as shown in the drawings.

Apparatus 10 further includes a first transition 92 between each blower 76 and heater 90 and a second transition 94 between each heater 90 and an exit duct 96 shown as having circular cross sections. In the form shown, ducts 96 are generally horizontally arranged generally parallel to base 12 and the length direction and in a spaced, parallel relation on opposite sides of engine 20 and generator 22. It should be appreciated that air can be directly exhausted from ducts 96 and/or through tubing or the like connected to ducts 96 with such tubing extending to a remote location including, but not limited to, an interior of a structure desired to be heated. To allow access to engine 20 and generator 22, first transition 92 and heater 90 can be removed such as by pivoting relative to second transition 94 such as by hinges 98.

An aerodynameter 100 can be provided such as in transition 94 to measure speed of air flowing through ducts 96. Likewise, a temperature sensor can be provided such as in transition 94 to measure temperature of air flowing through ducts 96.

Engine 20 and generator 22 are located intermediate transitions 92 and 94 and heaters 90, intermediate base 12 and elevated portion 32 and behind interconnection 70 which defines a compartment. Suitable closure paneling 110 can be carried by base 12 and located around manifold 30, transitions 92 and 94, heaters 90, engine 20 and generator 22. Ducts 38 and 96 extend through a rear, closure panel 112 of paneling 110. A dampened opening 114 can be provided in panel 112 generally aligned with engine 20 and generator 22, which can be opened to a greater degree with increasing temperature within paneling 110.

In the embodiment shown, an ordinary AC electrical generator 22 converts mechanical shaft power of engine 20 to electric power, which is, in turn, converted to heat. There are a number of important benefits of the embodiment shown. Electric generator 22 and electric heaters 90 used with it are highly reliable. The mean time between failures is more than 10 times the maintenance requirements associated with conventional devices. Generator 22 has no wear items, no leaks, no seals, and no fluids as are commonly used on conventional devices. Using generator 22, the control of the heating process is easily done by switching on and off heaters 90 as the need for heat changes. As an example, only one of the first and second pressure blowers 76 and/or of the first and second heaters 90 can be activated, if desired, or both of blowers 76 and of heaters 90 could be simultaneously activated. In either case, some or all of the heating elements inside heaters 90 can be activated, according to the heat needed. The nature of generator 22 is when there is no electrical load, generator 22 spins freely with almost no load other than bearing friction. As heaters 90 are switched on, the load to engine 20 correspondingly increases up to full load as needed. Rather than controlling heat output by switching heaters 90 alone, the engine 20 and generator 22 is slowed down which produces a lower frequency, lower voltage output which lowers the heat generated per heater 90. The control system adjusts the speed and the number of heaters 90 that are powered. The control will endeavor to operate with as many heaters on that it can while reducing heat output with speed of engine 20. The wear and noise of engine 20 is thereby reduced. Pure resistive heaters 90 do not care if the voltage or frequency changes. The power output is the result of the current times voltage. In resistive elements, the current falls proportionately with the voltage resulting in the power dropping by the square of the speed reduction.

Engine 20, generator 22, heat reclaim equipment, fuel tank, heat conversion device, and controls are all mounted on a trailer formed by base 12, wheels 14 and hitch 16. Generator 22 is close-coupled to engine 20. The output of generator 22 is wired through fuses and into the relays. When a relay is fired, power is supplied to each heater 90, which begins to provide heat. There is no wiring brought to the outside world. There are no other special electrical components needed. The function of the controller is to measure the temperature just before the electric heaters 90 and flow of the stream to be heated and an amount of heat required is calculated. From this amount of heat needed, the correct engine operating speed and number of heaters 90 is determined. Engine speed is automatically controlled using the Engine ECM interfaces available and the electronic controller switches relays using the 12 vdc power available from the engine battery. The control itself is powered from the engine's battery.

Additionally, a much higher percent of the exhaust heat is recovered by bringing the fluid to be heated into the exhaust heat exchanger first where the difference in temperature is greatest. By providing additional heat exchange surfaces, 100% of the other engine heat "losses" can still be recovered without overheating engine 20.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Method of generating heat comprising:
    operating an engine powering a generator generating electricity, with the engine including a radiator through which engine coolant flows;
    flowing air in a direction through a manifold from behind the engine and the generator above the engine and the generator to in front of the engine and the generator;
    flowing air from the manifold in front of the engine and the generator through the radiator;
    flowing air from the radiator through first and second electric heaters located on opposite sides of the engine and the generator, with the electricity generated by the generator creating heat in at least one of the first and second electric heaters; and
    flowing air from the first and second electric heaters through first and second exit ducts.

2. The method of claim 1 wherein operating the engine comprises operating the engine including an exhaust through which exhaust fumes flow; and the method further comprises: flowing the exhaust fumes from the exhaust through a heat reclaimer located in the manifold above the engine and the generator.

3. The method of claim 2 wherein flowing the exhaust fumes comprises flowing the exhaust fumes into a first chamber located in the manifold and extending generally perpendicular to the direction; flowing the exhaust fumes from the first chamber through a plurality of tubes extending from and in fluid communication with the first chamber; and flowing the exhaust fumes from the plurality of tubes into a second chamber located in the manifold, with the plurality of tubes being in fluid communication with the second chamber; and exhausting the exhaust fumes from the second chamber and out of the manifold, with flowing air through the manifold comprising flowing air past the second chamber, around and between the plurality of tubes, and past the first chamber.

4. The method of claim 3 wherein flowing the air comprises flowing the air through the manifold including a top and a bottom parallel to the bottom, with the plurality of tubes extending at a non-parallel, small acute angle relative to the top and the bottom.

5. The method of claim 4 wherein flowing the exhaust fumes comprises flowing the exhaust fumes into the first chamber located adjacent the top and spaced from the bottom of the manifold and into the second chamber located adjacent the bottom and spaced from the top of the manifold.

6. The method of claim 5 wherein operating the engine comprises combusting fuel pumped from a tank having a generally parallelepiped shape, with the engine and the generator mounted upon the tank.

7. The method of claim 6 wherein flowing the air from the radiator comprises rotating impellers of first and second pressure blowers about axes extending parallel to each other, with the first and second pressure blowers pressuring flowing of the air into the first and second heaters.

8. The method of claim 7 wherein flowing the air from the radiator comprises rotating a centrifugal impeller about an axis perpendicular to the axes of the first and second pressure blowers, with the centrifugal impeller pressuring air flowing from the radiator to the first and second pressure blowers.

9. The method of claim 8 further comprising enclosing the engine, the generator, the manifold, and the first and second electric heaters within paneling having a closure panel; and opening a damper in the closure panel according to temperature sensed within the paneling.

10. The method of claim 9 wherein opening the damper comprises opening the damper located opposite the generator and the engine from the radiator.

11. The method of claim 10 wherein flowing the air through the manifold comprises introducing air into the manifold through first and second entrance ducts located on opposite sides of the generator and the engine and extending at a small acute angle relative to horizontal.

12. The method of claim 11 wherein flowing the air through the first and second exit ducts comprises flowing air through the first and second exit ducts arranged horizontally in a spaced, parallel relation on opposite sides of the engine and the generator.

13. Apparatus providing flame-less heat comprising, in combination: a base; a generator mounted on the base; an engine mounted on the base powering the generator to generate electricity, with the engine including a radiator through which coolant flows, with the engine and the generator extending in a direction between a front end and a rear end; a manifold extending in the direction including an elevated portion, with the engine and the generator located intermediate the base and the elevated portion, with the manifold further including a vertical portion extending from the elevated portion towards the base and in front of the front end; a T interconnection in fluid communication with the vertical portion having first and second openings, with air flow being provided from the vertical portion through the radiator and the T-interconnection and through the first and second openings; first and second electric heaters located on opposite sides of the engine and the generator, with the generator being electrically connected to the first and second heaters; a first transition providing flow from the first opening through the first electric heater and through a first exit duct located rearward of the rear end of the engine and the generator; and a second transition providing flow from the second opening through the second electric heater and through a second exit duct located rearward of the rear end of the engine and the generator.

14. The apparatus of claim 13 further comprising, in combination: an exhaust heat reclaimer located in the elevated portion of the manifold, with the engine including an exhaust through which exhaust fumes flow, with the exhaust being in fluid communication with the exhaust heat reclaimer.

15. The apparatus of claim 14 wherein the exhaust heat reclaimer comprises a first chamber, with the exhaust being in fluid communication with the first chamber; a second chamber; and a plurality of tubes extending between and in fluid communication with the first and second chambers, with the second chamber being in fluid communication exteriorly of the manifold.

16. The apparatus of claim 15 wherein the elevated portion includes a top and a bottom parallel to the bottom, with the plurality of tubes extending at a non-parallel, small acute angle relative to the top and the bottom, with the first chamber located adjacent the top and spaced from the bottom, with the second chamber located adjacent the bottom and spaced from the top, with the first chamber located intermediate the vertical portion and the second chamber.

17. The apparatus of claim 16 wherein the base comprises a tank adapted to hold fuel for the engine.

18. The apparatus of claim 17 further comprising, in combination: first and second pressure blowers in communication with the first and second openings and the first and second transitions, respectively, with each pressure blower including a rotating impeller having an axis perpendicular to the direction.

19. The apparatus of claim 18 further comprising, in combination: a centrifugal impeller in the T interconnection rotatable about an axis parallel to the direction.

20. The apparatus of claim 19 further comprising, in combination: paneling enclosing the engine, the generator, the manifold, the first and second electric heaters, and the first and second transitions, with the paneling including a closure panel having a damper responsive to temperatures inside the paneling, with the engine and the generator located intermediate the vertical portion and the damper.

* * * * *